(12) United States Patent
Kobayashi

(10) Patent No.: US 6,883,056 B2
(45) Date of Patent: Apr. 19, 2005

(54) IEEE 1394 APPARATUS CAPABLE OF MAKING POWER CLASS COINCIDE EVEN AT THE CHANGE OVER OF A POWER SUPPLY TO BE USED

(75) Inventor: Masahisa Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 383 days.

(21) Appl. No.: 09/852,032

(22) Filed: May 10, 2001

(65) Prior Publication Data

US 2001/0042152 A1 Nov. 15, 2001

(30) Foreign Application Priority Data

May 12, 2000 (JP) ...................................... 2002-140173

(51) Int. Cl.$^7$ .............................................. G06F 13/14
(52) U.S. Cl. ......................... 710/305; 713/300; 307/87
(58) Field of Search ................................ 713/300, 310; 710/305; 307/85, 86, 87

(56) References Cited

U.S. PATENT DOCUMENTS

| 6,243,818 B1 | * | 6/2001 | Schwan et al. ............. 713/300 |
| 6,285,092 B1 | * | 9/2001 | Kawahara et al. ............ 307/85 |
| 2002/0152341 A1 | * | 10/2002 | Bennett ...................... 710/104 |
| 2003/0179719 A1 | * | 9/2003 | Kobayashi et al. ......... 370/282 |

FOREIGN PATENT DOCUMENTS

| JP | 10-262092 | 9/1998 |
| JP | 11-98159 | 4/1999 |
| JP | 11-163912 | 6/1999 |
| JP | 11-215158 | 8/1999 |

OTHER PUBLICATIONS

"IEEE1394 3–Port 400 Mbps Physical Layer (SBPH400–3)," Preliminary data sheet, SGS–Thomson Microelectronics, Mar. 16, 1998, 43 pp.*

* cited by examiner

Primary Examiner—Mark H. Rinehart
Assistant Examiner—Clifford Knoll
(74) Attorney, Agent, or Firm—Whitham, Curtis & Christofferson, P.C.

(57) ABSTRACT

An IEEE 1394 apparatus is disclosed wherein, even when the used power supply is changed over, coincidence of a power class is maintained. A voltage detection unit determines whether or not the output voltage of a power supply circuit is higher than a reference voltage. A code generation bloc generates, based on a result of the determination of the voltage detection unit, a code indicative of power class information which is information representing which one of power supplied from a serial bus and the power supply of its own is used for operation of the IEEE 1394 apparatus. When a changing point detection unit detects a change of the result of the determination from the voltage detection unit, it resets a PHY. When the PHY is reset, it performs self-identification and places the code generated by the code generation unit and indicative of the power class information into a Self-ID packet to be used for transmission of a result of the self-identification to a bus manager, and outputs the Self-ID packet.

4 Claims, 5 Drawing Sheets

IEEE 1394 APPARATUS CAPABLE OF MAKING POWER CLASS COINCIDE EVEN AT THE CHANGE OVER OF A POWER SUPPLY TO BE USED

BACKGROUND OF THE INVENTION

1. Field of the Invention

The present invention relates to an IEEE 1394 apparatus having an interface complying with the IEEE 1394-1995 standards (hereinafter referred to as IEEE 1394 standards), and more particularly to a power class control for controlling power class information.

2. Description of the Related Art

An interface complying with the IEEE 1394 standards attracts attention as a high-speed interface of the next generation. IEEE 1394 standards prescribes that 63 nodes at maximum can be connected to the same bus. Each node is not required to have its own power supply, and any node that does not have its power supply is adapted to receive power from the serial bus and operates with the power. For this reason, the power of the entire serial bus must be managed by some method so that the total power consumed by those nodes that receive supply of power from the serial bus may not exceed the power that can be supplied through the serial bus.

One of the nodes connected to the serial bus serves as a bus manager to manage the power of the serial bus. Therefore, the bus manager must acquire information on power in W (watt) each of the nodes connected to the serial bus can supply power to the serial bus when the node is operating with a power supply (power supply of its own) provided in the node itself and information on power in W each node consumes when the node is operating with power supplied through the serial bus.

To this end, each of the nodes connected to the serial bus performs self-identification to determine whether it is operating with a power supply of its own or with power supplied through the serial bus, when bus reset to initialize the serial bus has occurred. Each node then includes the result of determination as power class information in a Self-ID packet to output the Self-ID packet to the serial bus. The bus manager of the serial bus manages the power of the serial bus based on the power information in Self-ID packets output from the nodes.

Each node having an interface complying with IEEE 1394 standards has a power class controlling function to generate and control a code representative of such power class information.

A node denotes an apparatus that outputs a Self-ID packet to the serial bus and is recognized by the serial bus. However, one IEEE 1394 apparatus does not necessarily serve as one node, but may include a plurality of nodes. For the sake of simplicity, the following description is given of a case wherein an IEEE 1394 apparatus includes only one node. Thus, an IEEE 1394 apparatus means a node.

In order to describe a conventional IEEE 1394 apparatus having a power class controlling function, a 2-port repeater for connecting two ports is shown by way of example. FIG. 1 is a system block diagram showing a connection of a serial bus in which nodes 40 and 41 are interconnected with 2-port repeater 102. 2-port repeater 102 has two serial bus connectors 9, 10, which are connected to nodes 40, 41, respectively.

A configuration of conventional 2-port repeater 102 is shown in FIG. 2. 2-port repeater 102 includes power supply circuit 2 for supplying power to 2-port repeater 102 itself and the serial bus, diode 3, DC—DC converter 4, physical layer circuit (hereinafter referred to as PHY) 5, and power-on reset circuit 11.

Diode 3 prevents reverse current of power supplied from the serial bus. DC—DC converter 4 converts a voltage supplied from the serial bus or power supply circuit 2 into a voltage necessary for itself. Power-on reset circuit 11 generates a reset signal when it detects that a voltage has been supplied to PHY 5.

A power supply voltage supplied from power supply terminal 1 is converted into a DC voltage necessary for the serial bus by power supply circuit 2 and is supplied to the serial bus via diode 3 through serial bus connectors 9, 10. The voltage supplied to the serial bus is converted into a voltage necessary for PHY 5 by DC—DC converter 4 connected to the cathode side of diode 3 and is supplied to PHY 5. On the other hand, when no input voltage is supplied to power supply voltage input terminal 1, a DC voltage output from another node is supplied to DC—DC converter 4 through serial bus connector 9 or 10 and converted into a voltage of a predetermined value by DC—DC converter 4, and the voltage of the predetermined value is supplied to PHY 5. In this instance, the provision of diode 3 prevents a DC voltage from the serial bus from flowing reversely to power supply circuit 2.

Serial bus connector 9 or 10 supplies a DC voltage and a signal on the serial bus to another port. The DC voltage is supplied from connector pin $9_1$ ($10_1$) directly to connector pin $10_1$ ($9_1$). The signal is supplied from connector pin $9_2$ ($10_2$) to connector pin $10_2$ ($9_2$) past PHY 5.

When a voltage from DC—DC converter 4 is applied to PHY 5, a reset signal is output from power-on reset circuit 11 to reset PHY 5. The reset of PHY 5 once disconnects 2-port repeater 102 from the serial bus, and after the resetting is completed, 2-port repeater 102 is connected to the serial bus again. Reset of PHY 5 and the change of connection of the serial bus causes the nodes (nodes 40, 41 in FIG. 1) confronting with 2-port repeater 102 to detect the change of the connection, occurring bus resetting to initialize the serial bus.

In a system employing a serial bus, if a configuration of the serial bus is changed, a node that has detected the change generates bus resetting. The change of configuration of the serial bus includes a new connection of a node to the serial bus and a disconnection of a node from the serial bus.

In a system employing a serial bus, after bus resetting is performed, tree identification to identify a connection relationship in the system is performed, and then self-identification is performed in each node, the result of which is output as a Self-ID packet to the serial bus.

When the self-identification is performed, in 2-port repeater 102 in FIG. 2, power class information is previously set with manual operation and PHY 5 reads the power class information, includes it into a Self-ID packet and outputs the Self-ID packet to the serial bus. The bus manager in the serial bus checks the power class information in Self-ID packets to manage the power of the serial bus.

In 2-port repeater 102 which is a conventional IEEE 1394 apparatus, PHY 5 cannot determine whether the apparatus operates with power from power supply circuit 2 or with power supplied from the serial bus. For this reason, 2-port repeater 102 is unable to set a power class corresponding to its operation state when performing self-identification. This requires the aforementioned conventional IEEE 1394 apparatus to set a power class with manual operation.

FIG. 3 shows 2-port repeater 103 as an example of an IEEE 1394 apparatus that eliminates the necessity for such manual operation and can automatically set a power class. 2-port repeater 103 of FIG. 3 includes voltage detection unit 6 and code generation unit 7 in addition to the components of 2-port repeater 102 of FIG. 2.

Voltage detection unit 6 detects a state of an output voltage of power supply circuit 2 and determines whether or not a DC voltage is applied to an output terminal of power supply circuit 2. More specifically, voltage detection unit 6 is comprised of a comparator or the like and compares the DC voltage at the output terminal of power supply circuit 2 with reference voltage $V_{ref}$ to determine whether or not power supply circuit 2 has an output voltage.

Code generation unit 7 generates a code indicative of power class information representing that 2-port repeater 103 operates with a power supply of its own when voltage detection unit 6 has determined that an input voltage is applied to power supply input terminal 1, and generates another code indicative of power class information representing that 2-port repeater 103 operates with power from the serial bus when voltage detection unit 6 has determined that an input voltage is not applied to power supply input terminal 1.

In the conventional IEEE 1394 apparatus, voltage detection unit 6 detects presence or absence of an output voltage from power supply circuit 2, and code generation unit 7 generates a code representative of power class information based on the result of detection. This obviates manual operation for setting power class information.

In the conventional IEEE 1394 apparatus, when the power to be used is supplied either from power supply circuit 2 or from the serial bus, the state of the power supply coincides with the power class. However, the conventional IEEE 1394 apparatus suffer from a problem that when the used power supply is changed over after it starts operation with one of the power supplies, for example, when the power supply of its own is turned on while the apparatus is operating with power from the serial bus and consequently the apparatus now operates with the power supply of its own, the actual operation state does not coincide with the power class recognized by the bus manager.

SUMMARY OF THE INVENTION

It is an object of the present invention to provide an IEEE 1394 apparatus wherein, even when the used power supply is changed over after operation of the apparatus is started, an actual operation state coincides with a power class recognized by a bus manager.

In order to attain the above object, an IEEE 1394 apparatus according to the present invention comprises voltage detection means, code generation means, changing point detection means, and a physical layer circuit.

The voltage detection means determines whether or not an output voltage of a power supply of its own is present, and outputs the result of the determination. The code generation means generates, based on the result of the determination of the voltage detection means, a code indicative of power class information which is information representing which one of the power supplied from a serial bus and the power supply of its own is used for operation of the IEEE 1394 apparatus. The changing point detection means detects a change of the result of the determination output from the voltage detection means. The physical layer circuit is reset with an output signal from the changing point detection means to vary the connection of the serial bus to perform bus resetting, and places, when self-identification is performed in response to the occurrence of bus resetting, the code generated by the code generation means and indicative of the power class information into a Self-ID packet to be used for transmission of a result of the self-identification to a bus manager and outputs the Self-ID packet.

In the present invention, a change of the output voltage of the voltage detection means is detected by the changing point detection means to detect that the power supply of its own changes from an on-state to an off-state or conversely from an off-state to an on-state to reset the physical layer circuit, and a Self-ID packet including a code indicative of power class information which corresponds to the state after the used power supply is changed over is output. Accordingly, even if the used power supply is changed over after operation of the IEEE 1394 apparatus is started, the actual operation state coincides with the power class recognized by the bus manager.

The above and other objects, features and advantages of the present invention will become apparent from the following description with reference to the accompanying drawings which illustrate examples of the present invention.

DETAILED DESCRIPTION OF THE PREFERRED EMBODIMENTS

First Embodiment

Figure 1:
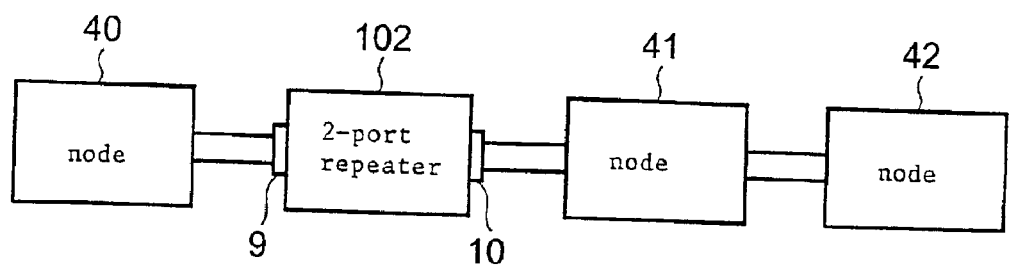
FIG. 1 is a system block diagram showing a connection of a serial bus in which nodes are connected to each other with a 2-port repeater.
Figure 2:
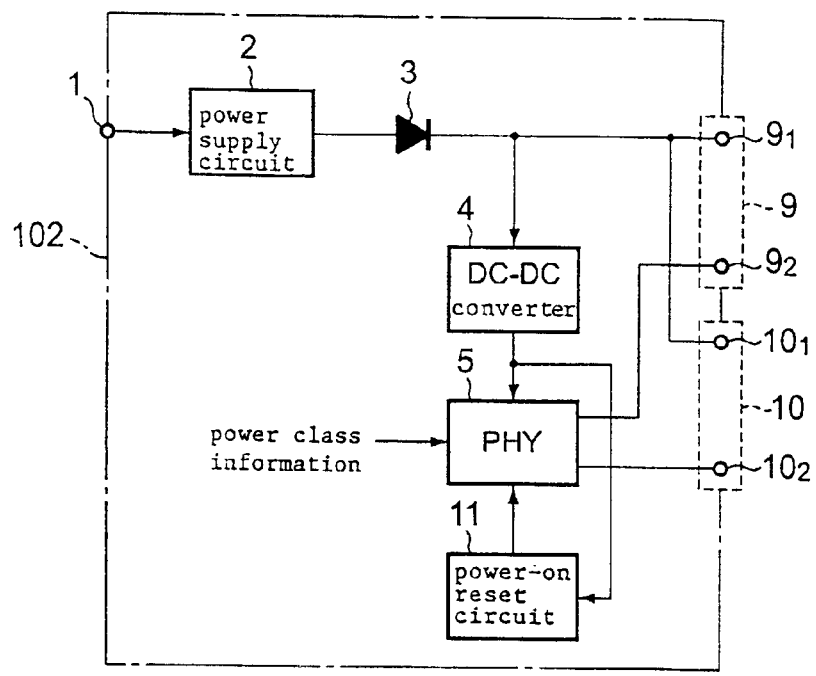
FIG. 2 is a block diagram showing a configuration of conventional 2-port repeater 102.
Figure 3:
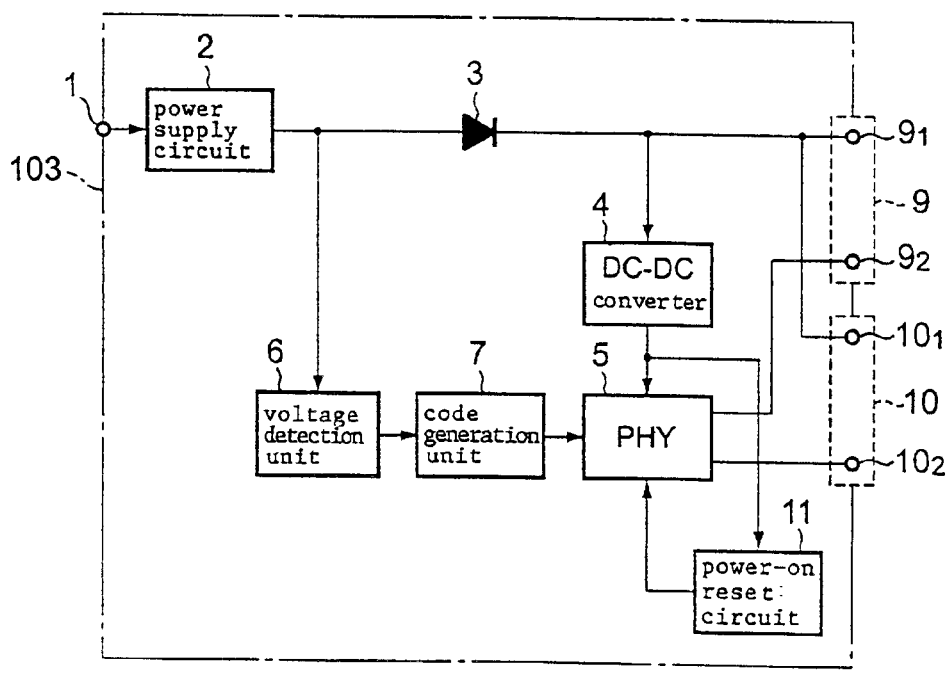
FIG. 3 is a block diagram showing a configuration of another conventional 2-port repeater 103.
Figure 4:
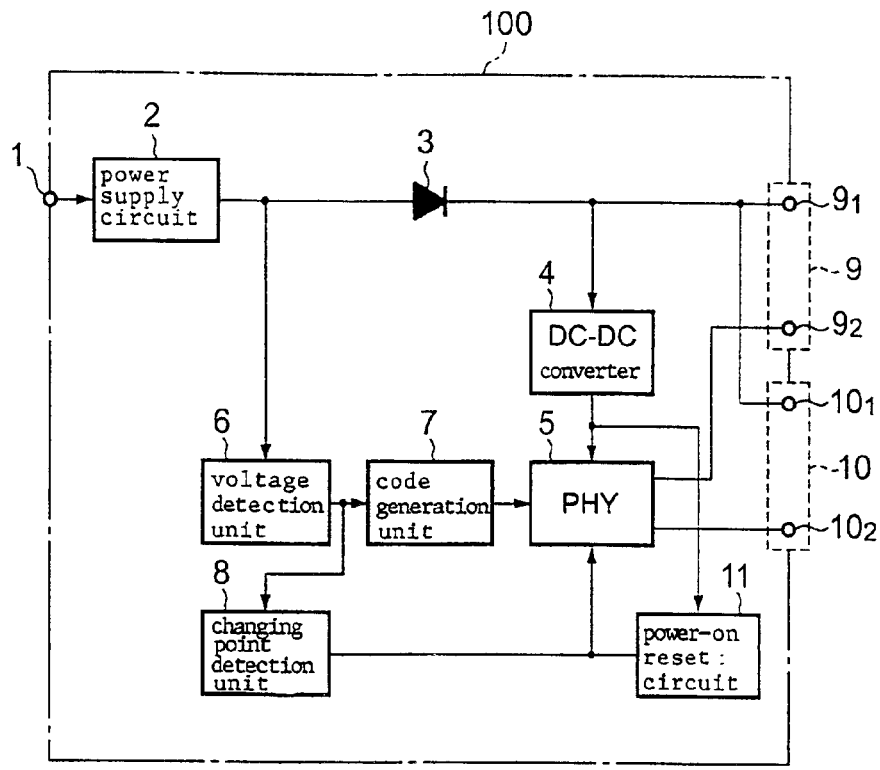
FIG. 4 is a block diagram showing a configuration of 2-port repeater 100 which is an IEEE 1394 apparatus of a first embodiment according to the present invention.

Referring now to FIG. 4, there is shown 2-port repeater 100 which is an IEEE 1394 apparatus of a first embodiment according to the present invention including changing point detection unit 8 added to conventional 2-port repeater 103 shown in FIG. 3. Components shown in FIG. 4 which are identical to those shown in FIG. 3 are denoted by identical reference numerals, and will not be described herein. The present embodiment is an application of the present invention to a 2-port repeater.

Changing point detection unit 8 generates and outputs a reset signal for resetting PHY 5 when it detects a rising edge or a falling edge of an output signal of voltage detection unit 6.

Figure 5:
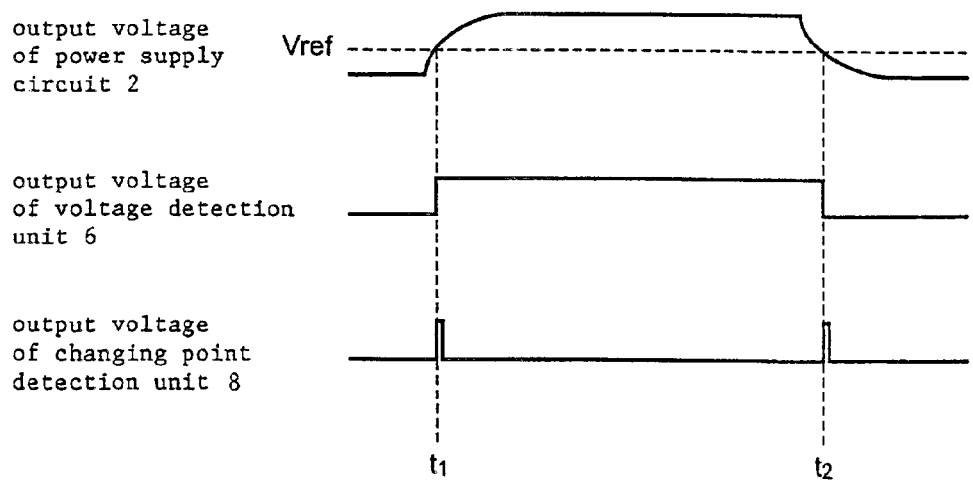
FIG. 5 is a timing chart illustrating operation of a power class controlling function of 2-port repeater 100 shown in FIG. 4.

FIG. 5 shows a timing chart illustrating a relationship among the output voltage of power supply circuit 2, the output voltage of voltage detection unit 6 and the output voltage of changing point detection unit 8. When the output voltage of power supply circuit 2 exceeds reference voltage $V_{ref}$ at time $t_1$, the output voltage of voltage detection unit 6 transits from the low level to the high level, and changing point detection unit 8 detects the rising edge of the output voltage of voltage detection unit 6 and outputs a reset signal for resetting PHY 5. Meanwhile, when the output voltage of power supply circuit 2 becomes lower than reference voltage $V_{ref}$ at time $t_2$, the output voltage of voltage detection unit 6 transits from the high level to the low level, and changing point detection unit 8 detects the falling edge of the output voltage of voltage detection unit 6 and outputs a reset signal to PHY 5.

Figure 6:
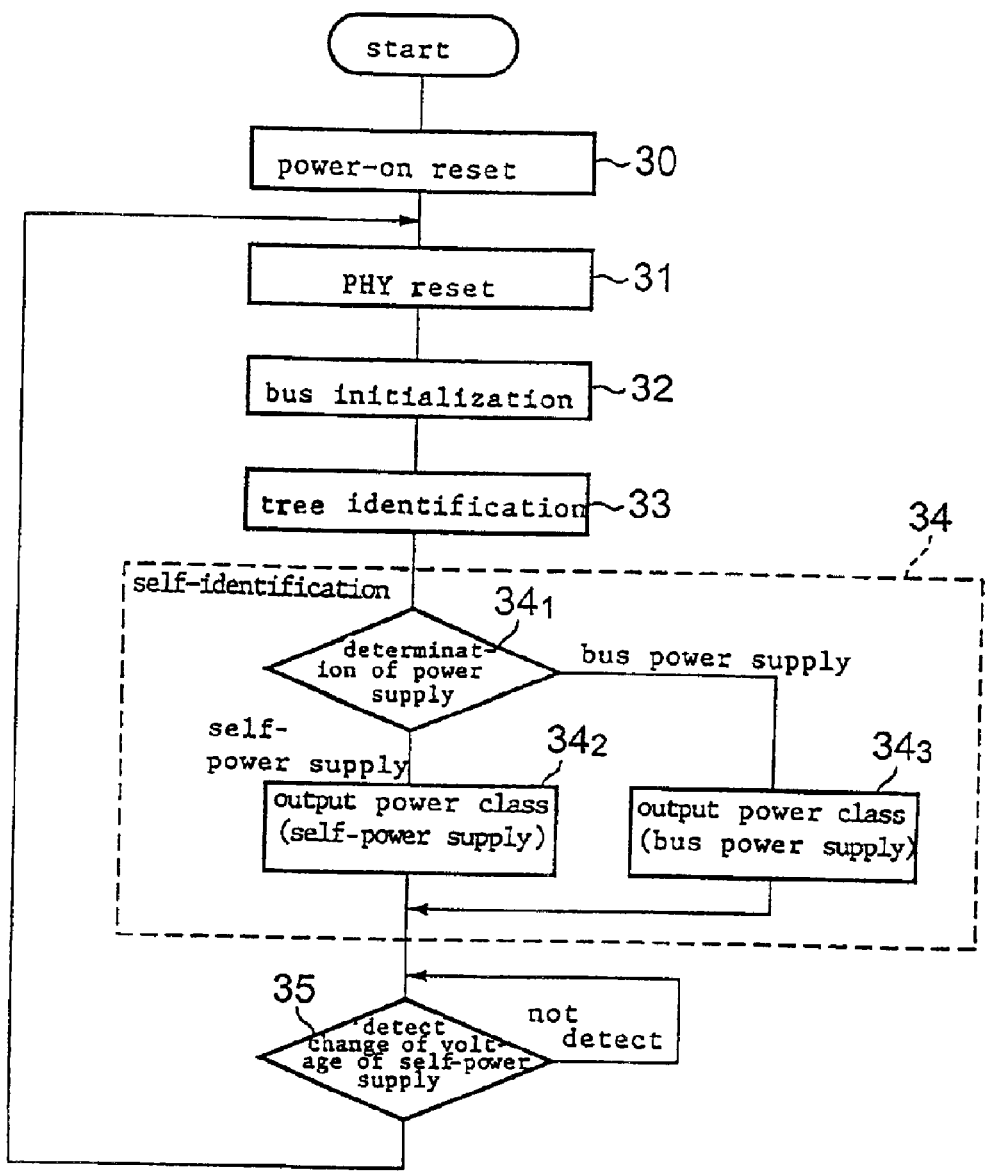
FIG. 6 is a flow chart illustrating the operation of the power class controlling function of 2-port repeater 100 shown in FIG. 4.

Next, operation of the IEEE 1394 apparatus of the present embodiment will be described with reference to a flow chart of FIG. 6.

When a power supply voltage is applied to power supply input terminal 1 or serial bus connector 9 (or 10), the power supply voltage is supplied to DC—DC converter 4, and DC—DC converter 4 supplies power to PHY 5. In step 30, power-on reset circuit 11 starts its operation in response to the turning on of the power applied to PHY 5, resetting PHY 5 in step 31. When PHY 5 is reset, 2-port repeater 100 is disconnected once from the serial bus, and when the resetting is completed, 2-port repeater 100 is connected to the serial bus again. As a result, the confronting nodes detect the change of the connection of the serial bus and performs bus resetting to initialize the bus in step 32. After the initialization of the serial bus is completed, tree identification is performed to determine a route in step 33. When the tree identification i.e., the determination of the route, is completed, self-identification is performed in step 34.

In the self-identification, it is determined in step $34_1$ whether or not the IEEE 1394 apparatus is operating with its own power supply or with the bus power supply. If it is determined in step $34_1$ that the IEEE 1394 apparatus is operating with its power supply of its own, then a Self-ID packet in which a power class indicating that the IEEE 1394 apparatus is operating with its power supply of its own is set is output in step $34_2$. Meanwhile, if it is determined in step $34_1$ that the IEEE 1394 apparatus is operating with the bus power supply, then a Self-ID packet is output in step $34_3$ in which a power class indicating that the IEEE 1394 apparatus is operating with the bus power supply is set. The bus manager of the serial bus manages the power of the serial bus based on the power classes in such Self-ID packets.

Next, description will be given regarding a case in which a power supply voltage is applied to power supply input terminal 1 when a DC voltage is applied to the serial bus will be described. When a power supply voltage is applied to input terminal 1, the output voltage of power supply circuit 2 is detected by voltage detection unit 6. When voltage detection unit 6 detects the output voltage of power supply circuit 2, code generation unit 7 generates a code indicative of power class information representing that the IEEE 1394 apparatus operates with its power supply of its own in step 35. Further, changing point detection unit 8 detects a change of the output of power supply circuit 2, i.e., a rising edge of the output of power supply circuit 2, and generates a reset signal having a predetermined duration at the output terminal thereof. Consequently, PHY 5 is reset in step 31. In short, when the operation of the IEEE 1394 apparatus changes from its operation with the serial bus power supply to its operation with the power supply of its own, initialization of the serial bus is performed in step 32, and tree recognition in step 33 and self-identification in step 34 are performed and a notification that the IEEE 1394 apparatus is operating with its power supply of its own is issued.

Operation of the IEEE 1394 apparatus when a power supply voltage to power supply input terminal 1 is turned off while the power supply voltage is applied to power supply input terminal 1 and a DC voltage is applied also from the serial bus will be described. When the power supply voltage to power supply terminal 1 is turned off, the output voltage of power supply circuit 2 gradually drops, and voltage detection unit 6 detects an off state of power supply circuit 2. As a result, code generation unit 7 generates a power class representing that the IEEE 1394 apparatus is operating with the power supply of the serial bus. In step 35, changing point detection unit 8 detects the change from on to off of the output of voltage detection unit 6 and generates a reset signal. Consequently, PHY 5 is reset in step 31. In short, when the operation of the IEEE 1394 apparatus while operating with its power supply of its own changes from the operation with the power supply of its own to the operation with the power supply of the serial bus, initialization of the serial bus is performed in step 32, and tree recognition in step 33 and self-identification in step 34 are performed and a notification that the IEEE 1394 is operating with the serial bus power supply is issued.

As described above, with the IEEE 1394 apparatus of the present embodiment, when the voltage detection unit 6 detects a voltage or when the detected voltage disappears, PHY 5 is reset to initialize the serial bus and a Self-ID packet having a power class corresponding to such detection or non-detection of a voltage is output. Therefore, the power supply with which the IEEE 1394 apparatus itself operates may coincide with the power class in the Self-ID packet conveyed to the serial bus.

It is to be noted that the present invention is not limited to the embodiment described above, and various modifications can be made thereto. For example, while the confronting apparatus perform bus resetting when PHY 5 in the embodiment is reset to disconnect and connect the IEEE 1394 apparatus from and to the serial bus, PHY 5 may otherwise output a bus resetting signal directly from an output signal of changing point detection unit 8.

Furthermore, while the present embodiment uses a 2-port repeater as an example of IEEE 1394 apparatus, the present invention is not limited to a 2-port repeater but can be applied similarly to any node only if it has a function of setting a power class.

Second Embodiment

Figure 7:
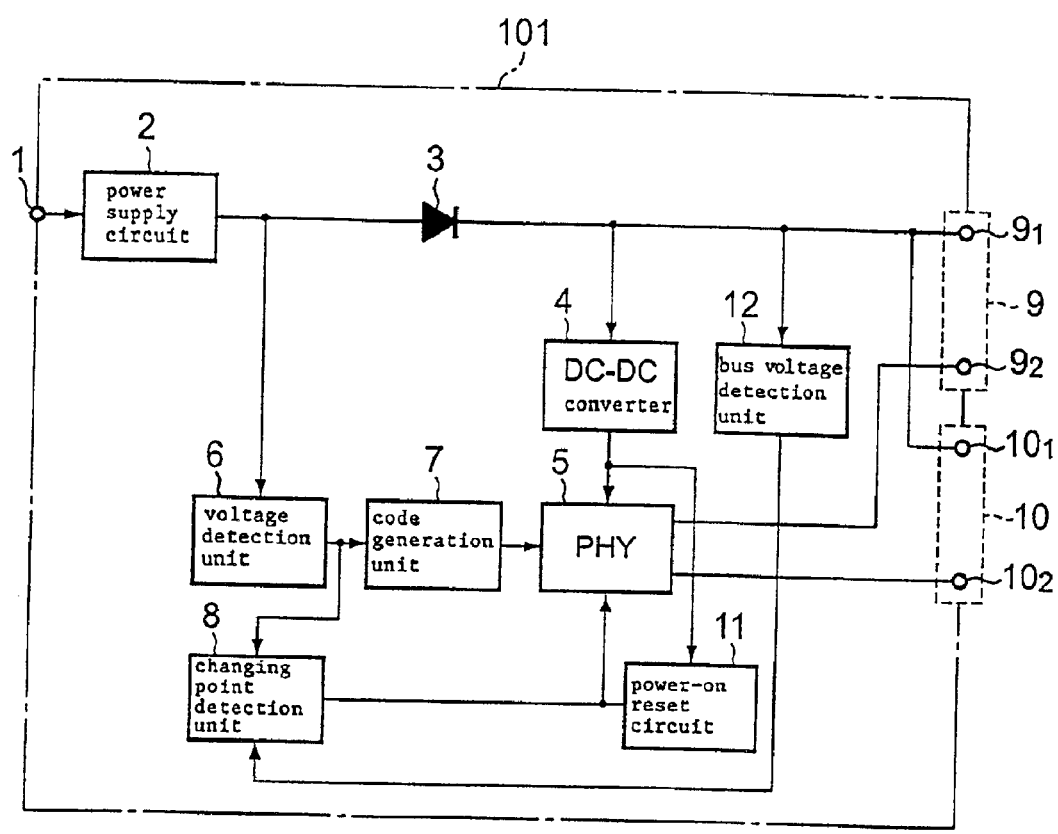
FIG. 7 is a block diagram showing a configuration of 2-port repeater 101 which is an IEEE 1394 apparatus of a second embodiment according to the present invention.

Next, an IEEE 1394 apparatus of a second embodiment of the present invention will be described. FIG. 7 is a block diagram showing a configuration of 2-port repeater 101 which is an IEEE 1394 apparatus of the second embodiment of the present invention. In FIG. 7, like components to those of FIG. 4 are denoted by like reference numerals and overlapping description of them is omitted herein.

The IEEE 1394 apparatus of the present embodiment includes bus voltage detection unit 12 in addition to the components of the IEEE 1394 apparatus of the first embodiment shown in FIG. 4.

Bus voltage detection unit 12 determines whether or not the DC voltage from the serial bus is higher than a predetermined voltage, and outputs a result of the determination. Further, changing point detection unit 8 in the present embodiment generates an output signal for resetting PHY 5 only when bus voltage detection unit 12 determines that the DC voltage of the serial bus is higher than a predetermined voltage.

In the IEEE 1394 apparatus of the first embodiment described hereinabove, when no voltage is supplied to the power supply line of the serial bus and PHY 5 operates only with the power supply from power supply circuit 2, if the power supply of power supply circuit 2 disappears, then voltage detection unit 6 determines that the output voltage from power supply circuit 2 has become lower than reference voltage $V_{ref}$, and a power class representing that the IEEE 1394 apparatus operates with the power supply from the serial bus is output from code generation unit 7. However, since no power is actually supplied from the serial bus, the power class does not coincide with the actual state. Further, changing point detection unit 8 detects a change of the output voltage from voltage detection unit 6 and resets PHY 5. Consequently, PHY 5 is disconnected from the serial bus and unnecessary bus resetting occurs. However, if bus resetting occurs, then such processes as tree identification and self-identification are performed. Preferably, therefore, unnecessary bus resetting is minimized.

Due to the provision of bus voltage detection unit 12, the present embodiment can achieve an advantage that unnecessary bus resetting is eliminated because changing point detection unit 8 does not reset PHY 5 in such a case as just described.

Furthermore, while it is described that code generation unit 7 and changing point detection unit 8 in the first and second embodiments described above are formed from hardware, the present invention is not limited to the specific form, but quite similar operation can be achieved also by processing by software.

While preferred embodiments of the present invention have been described using specific terms, such description is for illustrative purposes only, and it is to be understood that changes and variations may be made without departing from the spirit or scope of the following claims.

What is claimed is:

1. An apparatus connected to a serial bus and being operable using power supplied from said serial bus or its own power supply, said apparatus comprising:

a voltage detector for determining whether or not an output voltage of said power supply of its own is present and outputting the result of the determination;

a code generator for generating, based on the result of the determination of said voltage detector, a code indicative of power class information which is information representing which one of the power supplied from said serial bus and said power supply of its own is used for operation of said apparatus;

a power-on reset circuit;

a changing point detector for detecting a change of the result of the determination output from said voltage detector; and a physical layer circuit responsive to said power-on reset circuit or said changing point detector for varying the connection of said serial bus to perform bus resetting and for placing, when self-identification is performed in response to the occurrence of bus resetting, the code generated by said code generator and indicative of the power class information into a Self-ID packet to be used for transmission of a result of the self-identification to a bus manager and outputting the Self-ID packet.

2. An apparatus according to claim 1, further comprising a bus voltage detector for determining whether or not an output voltage of power supplied from said serial bus is present and outputting a result of the determination, and wherein said changing point detector detects a change of the result of the determination of said voltage detector only when said bus voltage detector detects that the power supplied from said serial bus is higher than a predetermined voltage.

3. An apparatus connected to a serial bus and being operable using power supplied from said serial bus or its own power supply, said apparatus comprising:

a voltage detector for determining whether or not an output voltage of said power supply of its own is present and outputting the result of the determination;

a code generator for generating, based on the result of the determination of said voltage detector, a code indicative of power class information which is information representing which one of the power supplied from said serial bus and said power supply of its own is used for operation of said apparatus;

a power-on reset circuit;

a changing point detector for detecting a change of the result of the determination output from said voltage detector; and a physical layer circuit for performing bus resetting in response to an output signal from either said power-on reset circuit or said changing point detector and for placing, when self-identification is performed in response to the occurrence of bus resetting, the code generated by said code generator and indicative of the power class information into a Self-ID packet to be used for transmission of a result of the self-identification to a bus manager and outputting the Self-ID packet.

4. An apparatus according to claim 3, further comprising a bus voltage detector for determining whether or not an output voltage of power supplied from said serial bus is present and outputting a result of the determination, and wherein said changing point detector detects a change of the result of the determination of said voltage detector only when said bus voltage detector detects that the power supplied from said serial bus is higher than a predetermined voltage.

* * * * *